Patented Oct. 15, 1929

1,731,643

UNITED STATES PATENT OFFICE

HERMANN WAGNER, OF BAD SODEN-ON-TAUNUS, AND ERICH FISCHER, OF HOCHST-ON-MAIN, GERMANY, ASSIGNORS TO GENERAL ANILINE WORKS, INC., OF NEW YORK, N. Y., A CORPORATION OF DELAWARE

AZO DYESTUFFS AND PROCESS OF PREPARING THEM

No Drawing. Application filed July 19, 1927, Serial No. 207,016, and in Germany July 29, 1926.

The present invention relates to the new azo dyestuffs of the general formula:

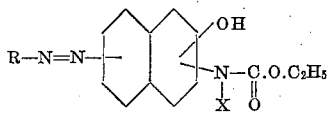

wherein R represents an aromatic residue of the group including the benzene and naphthalene series, X stands for hydrogen, alkyl, aryl, or aralkyl and wherein the aromatic nuclei may be further substituted.

These dyestuffs are obtainable for instance by coupling a diazo compound of the benzene or naphthalene series with a compound of the general formula:

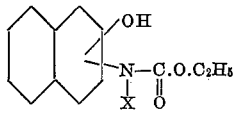

wherein X represents hydrogen, alkyl, aryl, or aralkyl, and wherein the naphthalene nucleus may be further substituted. They form red powders which dye wool even yellowish-red to bluish-red tints of good fastness to light.

The following examples serve to illustrate our invention without limiting it thereto, the parts being by weight.

1. 333 parts of the product of the following formula:

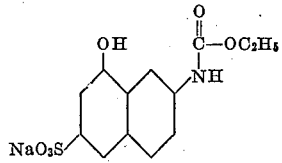

obtainable by the action of chloroformic-acid-ethylester upon sodium 2-amino-8-hydroxy-naphthalene-6-sulfonate, are dissolved in water. To the solution which is cooled with ice is added an excess of a sodium carbonate solution, and into the coupling liquid thus prepared is run a diazo solution obtained in known manner from 164 parts of para-aminomethylacetanilide. The separation of the dyestuff is completed by the addition of common salt.

The dyestuff thus obtainable is a red powder and corresponds most probably to the following formula:

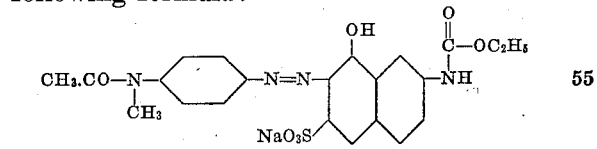

It gives dyeings of a yellowish-red tint on wool of very good properties and is above all distinguished for its excellent levelling power.

2. 435 parts of the body of the following constitution:

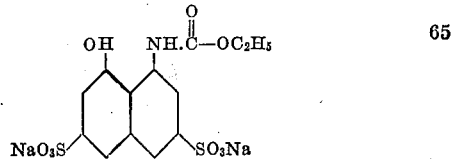

obtainable by the action of chloro-formic-acid-ethylester upon sodium 1-amino-8-hydroxynaphthalene-3.6-disulfonate, are coupled in the manner indicated in Example 1 with a diazo solution prepared from 421 parts of meta-xlyidine. The dyestuff which separates forms, when filtered by suction and dried, a red powder dyeing wool a very even, bluish-red tint of good fastness to light and corresponding most probably to the formula:

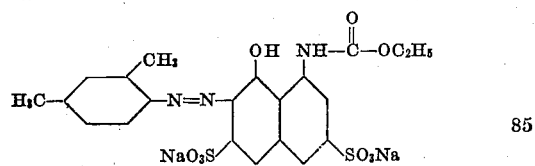

The aminonaphthol derivatives and diazo compounds used for the preparation of the dyestuffs may be of the most varied kind. Thus there may be used as coupling components for instance the following compounds:

The reaction products of chloro-formic-acid-ester upon 2-ethylamino-8-hydroxy-naphthalene-6-sulfonic acid, 2-amino-8-hydroxynaphthalene or the like. The new products can advantageously be used in the manufacture of diazo- and polyazo-dyestuffs.

When using as diazo component ortho-aminophenols, ortho-aminonaphthols or derivatives of these compounds, the dyestuffs thus obtainable can be afterchromed in known manner.

We claim:

1. As new products the azo dyestuffs of the general formula:

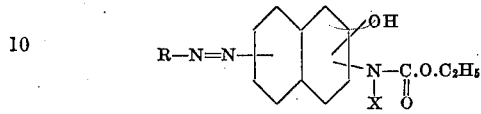

wherein R represents an aromatic residue of the group including the benzene and naphthalene series, X stands for hydrogen, alkyl, aryl, or aralkyl, and wherein the aromatic nuclei may be further substituted, being red powders and dyeing wool even yellowish-red to bluish-red tints of good fastness to light.

2. As new products the azo dyestuffs of the following formula:

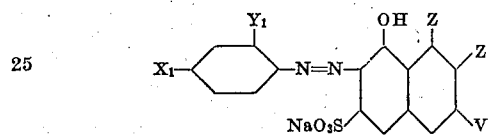

wherein $X_1$ stands for $CH_3$ or $$N(CH_3).CO.CH_3,$$

$Y_1$ for H or alkyl, one Z for H and the other Z for $NH.CO.CO_2H_5$, and V for H or $SO_3Na$, being red powders which dye wool very even yellowish-red to bluish-red tints of good fastness to light.

3. As new products the azo dyestuffs of the following formula:

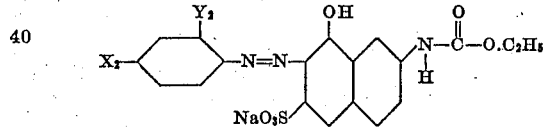

wherein $X_2$ stands for $CH_3$ or $$N(CH_3).CO.CH_3$$

group and $Y_2$ for H or $CH_3$, being red powders which dye wool very even yellowish-red to bluish-red tints of good fastness to light.

4. As a new product the azo dyestuff of the following formula:

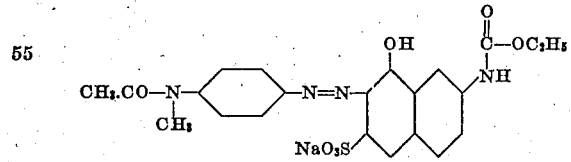

being a red powder which dyes wool very even yellowish-red tints of good fastness to light.

In testimony whereof, we affix our signatures.

HERMANN WAGNER.
ERICH FISCHER.